May 5, 1953 — A. L. HARBISON — 2,637,411
LUBRICATOR FOR CAR WHEEL FLANGES
Filed March 18, 1952
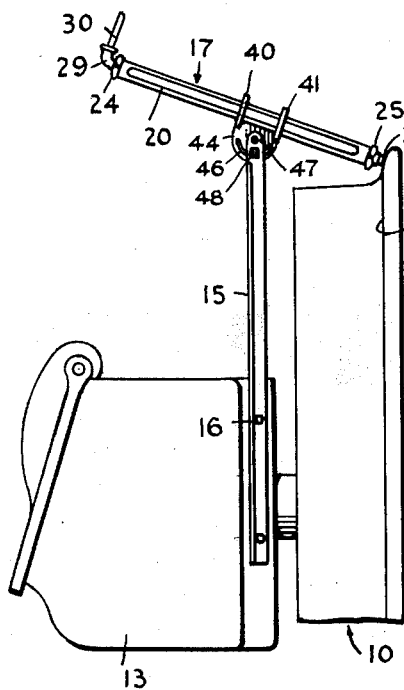
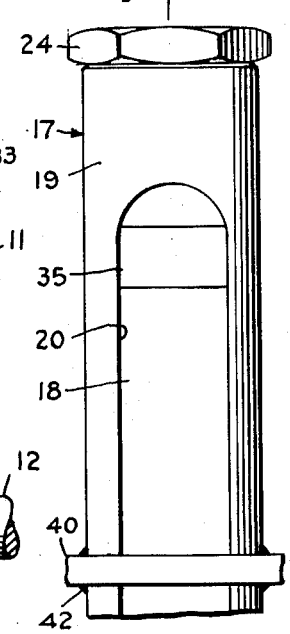
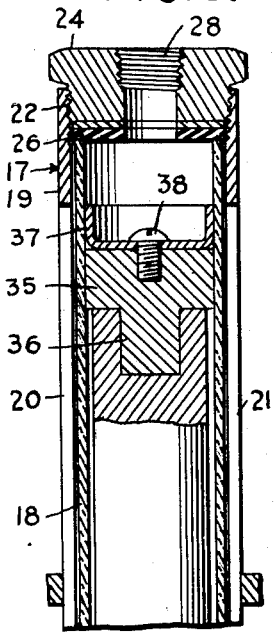
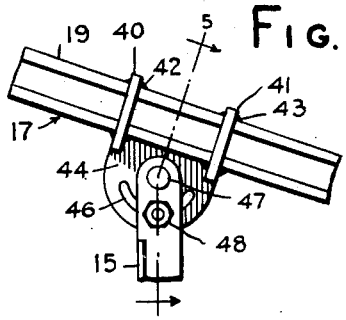
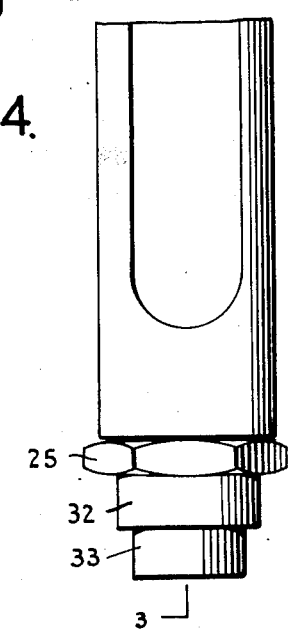
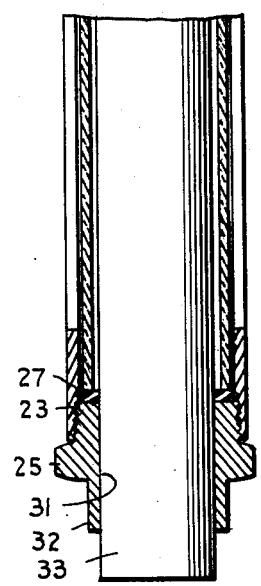
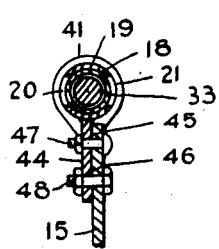
INVENTOR
ALAN L. HARBISON
BY
McMorrow, Berman & Davidson
ATTORNEY Patented May 5, 1953

2,637,411

UNITED STATES PATENT OFFICE 2,637,411

LUBRICATOR FOR CAR WHEEL FLANGES

Alan L. Harbison, Baden, Pa.

Application March 18, 1952, Serial No. 277,155

3 Claims. (Cl. 184—3)

This invention relates to lubricators for car wheels and more particularly to a vehicle carried device for applying lubricant to the flanges of rail supported vehicle wheels.

It is among the objects of the invention to provide an improved flange lubricator which can be easily mounted on a rail vehicle adjacent a wheel flange to supply lubricant to the flange; which carries lubricant in the form of an elongated stick of solid, graphite lubricant and maintains one end of the lubricant stick in contact with the associated wheel flange; which utilizes air pressure at a predetermined value to force the lubricant stick against the associated flange with a predetermined, substantially constant pressure; which has a transparent window through which the quantity of lubricant in the lubricator can be visually determined; and which is simple and durable in construction, economical to manufacture, easy to install, and positive and effective in operation.

Other objects and advantages will become apparent from a consideration of the following description and the appended claims in conjunction with the accompanying drawing wherein:

Figure 1 is a fragmentary elevational view of a flanged vehicle wheel and axle assemble with a wheel flange lubricator illustrative of the invention operatively mounted thereon;

Figure 2 is a side elevational view of the lubricator;

Figure 3 is a longitudinal cross sectional view on the line 3—3 of Figure 2;

Figure 4 is a fragmentary side elevational view of the lubricator; and

Figure 5 is a cross sectional view on the line 5—5— of Figure 4.

With continued reference to the drawings, the numeral 10 generally indicates a flanged wheel for a rail carried vehicle. The wheel has a flange 11 at one side thereof and is mounted on an axle 12 one end of which extends into a journal box 13, of known construction, disposed at the outer side of the wheel and on which the vehicle body or frame is supported by the usual suspension means well known to the art.

In ordinary railway vehicles two or more axles with the associated wheels, journal boxes and other necessary components are assembled together into a truck and the vehicle frame or body is supported on two such trucks disposed one near each end of the vehicle. As such trucks pass around curves in railway tracks the wheel flanges bear against the inner sides of the rails at the outer sides of the curves under heavy pressure which results in friction which rapidly wears the rails and the wheel flanges and causes noise and vibration. Arrangements have previously been devised for applying lubricant to the wheel flanges to reduce the friction between the flanges and the adjacent rails but such previously provided devices have not been entirely successful for various reasons among which have been the difficulty of mounting them on a vehicle and adjusting them to apply the lubricant at the proper locations on the associated wheel flanges, the difficulty of applying the proper pressure to the lubricant at all times and avoiding rapid wasting of the lubricant, and the difficulty of determining by inspection the amount of lubricant in the lubricator resulting frequently in depletion of the lubricant while the vehicle is in transit and consequent lack of lubrication of the wheel flanges until the vehicle is brought to an overhaul station at which the lubricator can be disassembled and replenished.

The flange lubricator of the present invention comprises a standard 15 mounted on one side of the journal box 13 by suitable means, such as the bolts or rivets 16 and extending upwardly from the journal box to a position opposite the top portion of the flange 11 of the associated wheel, and a lubricator receptacle, generally indicated at 17 and illustrated in detail in Figures 2 and 3, adjustably mounted on the upper end of the standard 15.

The lubricator receptacle 17 comprises a first tubular body 18 of elongated cylindrical shape formed of a suitable transparent material, such as glass. Such a tubular body having an outside diameter of approximately one inch and a length of approximately twelve inches has been found to provide excellent results in use. A second or outer tubular body 19 also of elongated cylindrical shape, and formed of a suitable durable material, such as iron or steel, closely receives the first or inner body 18 and extends at its ends beyond the adjacent ends of the inner body, as illustrated in Figure 3. The outer tubular body 19 has oppositely disposed, longitudinally extending openings or slots 20 and 21 therein each extending from a location adjacent one end to a location adjacent the other end of the outer tubular body and providing window openings through which lubricant in the transparent inner tubular body 18 can be viewed to visually determine the quantity of lubricant in the lubricator. The outer tubular body is also internally screw threaded at its opposite ends, as indicated at 22 and 23 and nuts 24 and 25 are threaded one into each end of the outer body 19 and exert pressure on the ends of the inner tubular body 18. A gasket 26 of resilient material is interposed between the inner end of the nut 24 and adjacent end of the tubular body 18 and a gasket 27 of resilient material is interposed between the inner end of the nut 25 and the adjacent end of the inner tubular body so that the ends of the inner tubular body 18 are sealed to the inner ends of the nuts 24 and 25.

The nut 24 is provided with a tapped hole 28 extending therethrough and extended through the gasket 26 and an elbow fitting 29 is threaded at one end into the hole 28 and receives at its other end one end of a compressed air line 30. The compressed air line 30 leads from the compressed air brake system of the vehicle through a suitable pressure reduction valve and is effective to supply compressed air at a relatively low pressure, three or four pounds per square inch for example, to the interior of the inner tubular body 18 at the end of the latter adjacent the nut 24.

The nut 25 is provided with a reamed bore 31 extending longitudinally therethrough and with an annular boss or flange 32 surrounding the bore 31 at the other end of the nut. The bore 31 is accurately dimensioned to slidably receive a solid lubricant stick 33 of elongated cylindrical shape, such lubricant stick being formed of graphitic carbon and other constituents as may be desired.

A piston 35 is slidable in the inner tubular body 18 and has at its end adjacent the nut 25 a coaxially disposed boss or extension 36 which is received in a recess in the adjacent end of the lubricant stick 33 to secure the lubricant stick to the piston, the connection between the lubricant stick depending on the friction between the boss 36 and the surface of the lubricant stick engaged by this boss. The piston has on its end adjacent the nut 24 a cup 37 of flexible or resilient material, such as leather or rubber to provide an air seal between the piston and the inner surface of the tubular body or cylinder 18, this cup being secured to the piston by the screw 38 extending through an aperture in the cup threaded into a tapped hole in the piston.

With the above described arrangement, compressed air admitted to the cylinder 18 from the compressed air line 30 and acting against the cup 37 on the piston 35 tends to force the lubricant stick 33 outwardly of the nut 25 and against the associated wheel flange 11 with a predetermined, substantially constant pressure.

Flat rings 40 and 41 surround the outer tubular body 19 intermediate the ends of the outer tubular body and in spaced apart relationship to each other, as is particularly illustrated in Figure 4, and are rigidly secured to the outer tubular body by suitable means, such as the weld joints 42 and 43. A flat lug 44 having a straight edge and an arcuately curved edge joined at its ends to the straight edge at the opposite ends of the latter has its straight edge disposed against the outer surface of the outer tubular body 19 between the rings 40 and 41 and between the window openings 20 and 21 in the outer tubular body and extends outwardly from the outer tubular body radially thereof. This lug 44 is rigidly secured to the rings 40 and 41 as by being welded thereto and is provided with an aperture 45 adjacent the tubular body 19 and an arcuate, closed slot 46 concentric with the aperture 45 and disposed at the side of the latter remote from the tubular body 19. The standard 15 has a flattened upper end portion which overlaps one side of the lug 44 and is provided with spaced apart apertures one of which registers with the aperture 45 and the other of which registers with the slot 46 in the lug. A bolt 47 extends through the aperture in the lug 44 and through the registering aperture in standard 15 to pivotally connect the bracket to the standard and a second bolt 48 extends through the slot 46 in the lug and through the registering aperture in the standard 15 to secure the lubricator receptacle 17 in selected positions of angular adjustment relative to the standard 15.

With the above described arrangement the lubricator can be easily mounted on the vehicle and the end of the lubricant stick 33 projecting out of the nut 25 can be brought to bear at the desired location on the associated wheel flange 11 and pressed against the surface of the wheel flange with a substantially constant, predetermined pressure selected to maintain the proper lubrication of the flange without waste of lubricant. The quantity of lubricant in the lubricator can be quickly determined by visual inspection at any stop of the vehicle and, if necessary, additional lubricant can be added by loosening the bolt 48, moving the end of the lubricant stick above the wheel flange and forcing another lubricant stick into the lubricator through the nut 25, then returning the lubricator to its original position with the end of the lubricant stick in contact with the wheel flange. It will be noted that the diameter of the bore 31 through the nut 25 is somewhat less than the inside diameter of the inner tubular body 18 so that the gasket 27 provides an internal annular shoulder which will engage the piston 35 if the piston is accidentally moved to the end of the tubular body or cylinder 18 adjacent the nut 25 and prevent accidental movement of the piston out of the lubricator while additional lubricant is being added.

The invention may be embodied in other specific forms without departing from the spirit or essential characteristics thereof. The present embodiment is, therefore, to be considered as illustrative and not restrictive, the scope of the invention being indicated by the appended claims rather than by the foregoing description, and all changes which come within the meaning and range of equivalency of the claims, are therefore, intended to be embraced therein.

What is claimed is:

1. A wheel flange lubricator comprising a first tubular body of transparent material, a second tubular body receiving said first tubular body and having at least one longitudinally extending window opening therein and internally screw threaded end portions extending beyond the corresponding ends of said first tubular body, nuts threaded one onto each end of said second tubular body exerting pressure on the adjacent ends of said first tubular body, gaskets disposed one between each of said nuts and said first tubular body, one of said nuts having a reamed bore therethrough adapted to slidably receive a stick of solid lubricant and the other of said nuts having a tapped hole therein adapted to receive one end of an air line, a piston in said first tubular body having at its end adjacent said one nut a boss formation adapted to engage the adjacent end of a lubricant stick received in said first tubular body and having a piston cup of flexible material at its other end, said piston serving to exert pressure on an associated lubricant stick in a direction outwardly of said one nut when air under pressure is admitted to said first tubular body through said other nut, a lug secured to said second tubular body intermediate the ends of the latter and projecting laterally therefrom, said lug having an aperture therein and an arcuate slot concentric with said aperture, a standard overlapping said lug and adapted to be mounted on a vehicle adjacent a wheel flange to be lubricated, said standard having apertures therein registering respectively with the aperture and the slot in said lug, and bolts extending through said lug and said standard holding said lubricator in selected positions of angular adjustment relative to said standard.

2. A wheel flange lubricator comprising an inner tubular body of transparent material, an outer tubular body receiving said inner tubular body and having at least one longitudinally extending window opening therein, nuts threaded onto said outer tubular body one at each end thereof and exerting pressure on the adjacent ends of said inner tubular body, one of said nuts having a reamed bore therethrough adapted to slidably receive a stick of solid lubricant and the other of said nuts having a tapped hole therein adapted to receive one end of an air line, a piston in said inner tubular body having at its end adjacent said one nut a lug formation adapted to engage the adjacent end of a lubricant stick received in said inner tubular body and having a piston cup of flexible material at its other end, said piston serving to exert pressure on an associated lubricant stick in a direction outwardly of said one nut when air under pressure is admitted to said inner tubular body through said other nut, a lug secured to said outer tubular body intermediate the ends thereof and projecting outwardly therefrom, a standard overlapping said lug and adapted to be mounted on a vehicle adjacent a wheel flange to be lubricated, and means pivotally connecting said standard to said lug for holding said lubricator in selected positions of angular adjustment relative to said standard.

3. A wheel flange lubricator comprising an inner tubular body of transparent material, an outer tubular body receiving said inner tubular body and having at least one longitudinally extending window opening therein, nuts threaded onto said outer tubular body one at each end thereof and exerting pressure on the adjacent ends of said inner tubular body, one of said nuts having a reamed bore therethrough adapted to slidably receive a stick of solid lubricant and the other of said nuts having a tapped hole therein adapted to receive one end of an air line, a piston in said inner tubular body adapted to engage the adjacent end of a lubricant stick and exert pressure thereon in a direction outwardly of said one nut when air under pressure is admitted to said inner tubular body through said other nut, a standard adapted to be mounted on a vehicle adjacent a wheel flange to be lubricated, and means pivotally connecting said standard to said outer tubular body intermediate the length of the latter to support said lubricator in selected positions of angular adjustment relative to said standard.

ALAN L. HARBISON.

References Cited in the file of this patent

UNITED STATES PATENTS

| Number | Name | Date |
|---|---|---|
| 667,148 | Garrels | Jan. 29, 1901 |
| 871,549 | Willson | Nov. 19, 1907 |

FOREIGN PATENTS

| Number | Country | Date |
|---|---|---|
| 110,896 | Great Britain | Nov. 8, 1917 |